2,867,933
FISH LURE
Byron O. Stookey, Hatboro, Pa.
Application January 4, 1957, Serial No. 632,463
1 Claim. (Cl. 43—42.02)

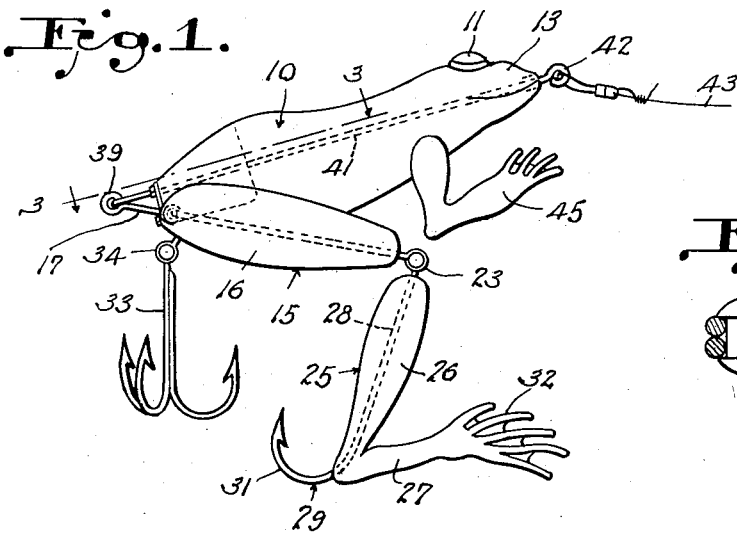
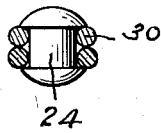
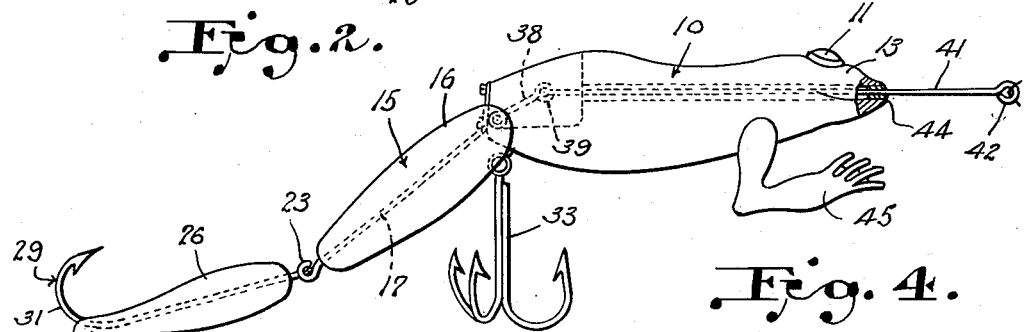
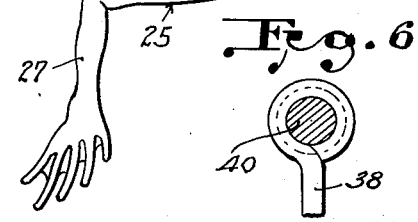
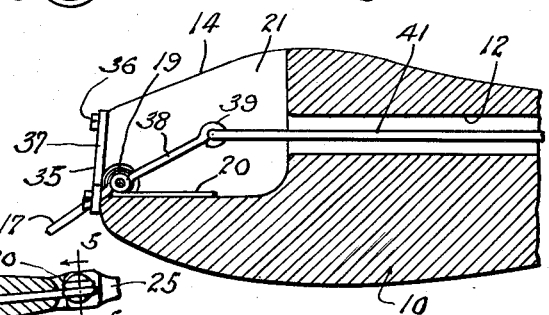
Byron O. Stookey
INVENTOR 2,867,933
Patented Jan. 13, 1959

This invention relates to fish lures, and more particularly to a lure which simulates a live frog.

An object of this invention is to provide a fish lure in the form of a frog which upon being placed in moving water, or upon being drawn through the water will simulate the movements of a live frog so as to thereby attract bass or other fish in the same manner as such fish is attracted by live frogs.

Another object of this invention is to provide a fish lure which is of simple construction and is capable of withstanding the strains and stresses to which a lure of this type may be subjected.

A further object of this invention is to provide a fish lure in the shape of a frog wherein the legs are pivoted onto the body and are spring-pressed to a folded or collapsed position.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a detail side elevation of a fish lure simulating a frog and constructed according to an embodiment of this invention and showing the lure in a retracted position.

Fig. 2 is a detail side elevation partly broken away and in section of the lure in extended position.

Fig. 3 is a fragmentary sectional view taken on line 3—3 of Fig. 1 showing also portions of the legs in section.

Fig. 4 is a vertical longitudinal section on an enlarged scale with the legs in extended position.

Fig. 5 is a sectional view taken on line 5—5 of Fig. 3.

Fig. 6 is a fragmentary sectional view taken on line 6—6 of Fig. 3.

Referring to the drawing, the numeral 10 designates generally a lure body which is constructed to simulate the body of a frog. The body 10 has a pair of eyes 11 on the upper forward portion thereof, and the body 10 is provided with a longitudinal opening 12 extending from the head 13 to a tail portion 14. A pair of legs generally indicated at 15, are disposed on each side of the body 10 at the rear thereof and each leg member 15 is provided with an upper member 16 within which one bar 17 of a U-shaped pivot supporting means is adapted to be extended. The bar 17 is connected to a bight 18 which extends through the rear portion of the tail 14 and the bight 18 has disposed thereabout a pair of coil springs 19. The springs 19 are connected together by an integral U-shaped connecting member 20 which extends into a recess 21 formed in the tail portion 14. One end of each coil spring 19 is formed integral with the U-shaped member 20 and the other or outer end of each spring 19 is provided with a hook-shaped portion 22 which is extended into the leg member 16 as shown in Fig. 3. The springs 19 are adapted to normally urge the leg members 16 to assume an acutely angled position with respect to the body 10, as shown in Fig. 1. Each rod 17 is provided at its forward end with an eye 23 through which a pivot member or rivet 24 loosely engages. Each leg member 15 also includes a normally acutely angled outer leg portion 25 which is formed of leg members 26 and 27. The shank 28 of a hook 29 is extended through the leg element 26 and the eye 30 of hook 29 is engaged with pivot member 24 as shown in Fig. 5. The shank 28 of hook 29 extends through the lower end of leg member 26 so that the bill portion 31 of hook 29 will be projected from the lower end of leg element 26. Leg element 27 includes claws 32 simulating the claws of a normal frog. A horizontal hook 33 is secured to an eye screw 34 which is secured within the lower rear portion of tail member 14. In the normal relaxed position of leg element 27 this element will be disposed as shown in Fig. 1 at an acute angle with respect to leg element 26. However, leg members 26 and 27 are formed of rubber or other similar material so that when the lure is in running water or is being pulled through water element 27 will swing rearwardly to assume a position substantially as shown in Fig. 2. A plate 35 is fixed by fastening means 36 to the rear of the body 10 and a plate 35 is provided with a vertically disposed slot 37 through which a lever 38 is adapted to loosely engage. The lever 38 is fixed to the bight or shaft 18 and lever 38 is formed with an eye 39 through which the angularly bent rear end 40 of a rod 41 is adapted to loosely engage. The rod 41 extends loosely through the bore 12 and the forward end of rod 41 is provided with an eye 42 to which one end of a line or leader 43 is adapted to be connected.

As shown in Fig. 2 the forward end of body 10 is provided with a bearing 44 through which the rod 41 slidably engages. The body 10 is also provided as shown in Fig. 1 with a pair of obtusely angled front legs 45 which may be of flexible construction so as to swing relative to the body 10 as the body is pulled through the water or as the water flows past the body 10.

In the use of this lure the lure is secured to the fishing line or leader 43. The lure upon entering the water may be pulled forwardly through the water and in the movement of the lure through the water the legs 15 will assume an animated relation with respect to the body 10 simulating the leg movements of a natural frog.

As the lure moves through the water the legs 15 will project rearwardly and then move forwardly so that the lure will provide an attraction to fish.

What is claimed is:

A fish lure comprising a body member having a shape simulating a frog, a U-shaped member having parallel arm and a bight portion, said bight portion being pivotally mounted in said body at the rear end thereof, with the bight portion extending transversely across the rear end of said body, a coil spring surrounding said bight and constantly urging said U-shaped member to a normal position with the parallel arms thereof disposed at an acute angle to the length of said body, upper leg elements encompassing said arms, lower leg elements pivotally secured to the lower ends of said upper leg elements, each of said lower leg elements being formed of yieldable resilient material and including a foot portion yieldably biased to a normal position at an acute angle relative to the adjacent lower leg element, said body having a recess in the rear thereof, a lever fixed to the bight of said U-shaped member and engaging in said recess, said body having a longitudinal bore therethrough terminating in said recess, and a rod loosely engaging in said bore and pivotally secured to said lever, said rod having an eye at the forward end thereof for connecting with a fishing line.

References Cited in the file of this patent
UNITED STATES PATENTS

| 941,911 | Burthe | Nov. 30, 1909 |
| 1,849,434 | Page | Mar. 15, 1932 |